United States Patent [19]

Paymal

[11] 4,223,667
[45] Sep. 23, 1980

[54] APPARATUS FOR SUPPORTING SOLAR COLLECTORS ON A BUILDING

[75] Inventor: André Paymal, Saint-Germain-en-Laye, France

[73] Assignee: Saint-Gobain Industries, Neuilly-sur-Seine, France

[21] Appl. No.: 932,699

[22] Filed: Aug. 10, 1978

[30] Foreign Application Priority Data

Aug. 25, 1977 [FR] France ................. 77 25947

[51] Int. Cl.³ .................... F24J 3/02; E04D 1/36
[52] U.S. Cl. ..................... 126/450; 52/395; 52/460; 52/476
[58] Field of Search ........... 126/270, 271, 450, 442, 126/448, 449; 52/395, 476, 460, 208, 209

[56] References Cited

U.S. PATENT DOCUMENTS

| | | | |
|---|---|---|---|
| 1,812,009 | 6/1931 | Lenke | 52/395 |
| 1,976,993 | 10/1934 | Huston, Jr. | 52/395 |
| 2,022,541 | 11/1935 | Faistenhammer | 52/460 |
| 3,844,087 | 10/1974 | Schultz et al. | 52/476 X |
| 3,980,071 | 9/1976 | Barber, Jr. | 126/271 |
| 4,108,155 | 8/1978 | Koizumi et al. | 126/270 |
| 4,124,028 | 11/1978 | Noble | 126/271 |

FOREIGN PATENT DOCUMENTS

| | | |
|---|---|---|
| 1041751 | 10/1953 | France . |
| 1063879 | 5/1954 | France . |
| 1067805 | 6/1954 | France . |
| 2268914 | 11/1975 | France . |
| 2319858 | 2/1977 | France . |
| 2330974 | 6/1977 | France . |

OTHER PUBLICATIONS

"Advances in Solar Heating and Cooling Systems", Dan S. Ward, pp. 199–204, *The Physics Teacher*, vol. 14, No. 4.

*Primary Examiner*—Samuel Scott
*Assistant Examiner*—Lee E. Barrett
*Attorney, Agent, or Firm*—Pennie & Edmonds

[57] ABSTRACT

A pair of panels which may comprise a solar collector having an absorber and a transparent panel are supported on and integrated with a building, such as on a roof. The means of support includes a base mounting member, an intermediate mounting member, a top cover member and a plurality of bearing members. The base mounting member is secured to the building and supports the region of the edges of two absorbers of adjacent solar collectors in substantially contiguous relation. The intermediate mounting member is supported on each absorber and, in turn, supports two plates of the adjacent solar collectors. The top cover member is supported on each plate and each of the top cover members and intermediate mounting member are secured to the base mounting member. Contact between each member and the solar collector is through the bearing members which provide a tight sealing engagement upon securement.

17 Claims, 2 Drawing Figures

APPARATUS FOR SUPPORTING SOLAR COLLECTORS ON A BUILDING

BACKGROUND OF THE INVENTION

1. Field of the Invention:

The present invention relates to apparatus for mounting a plurality of pairs of panels outwardly of and integrated with the support members of a building. Preferably, the panels of each pair comprise a solar collector and are integrated with the support members of the roof of the building.

2. Description of the Prior Art:

Many solar collectors which have been designed for present-day use have been designed for mounting on the outside of a building, such as on the roof and even on the ground. As may be appreciated, solar collectors which are mounted in this fashion are exposed to ambient conditions and it has been required that added protection be provided to isolate the solar collector for those conditions. It goes without saying the requirement of protecting the solar collectors from ambient conditions introduces expense to the overall installation expense. Further, it is difficult, if not impossible, to conceal those solar collectors which are designed for use outside of a building, in the environments described, and the difficulty of concealment is magnified as the solar collector is increased in size to serve a number of heating installations.

For these reasons, it has been recommended both by architects and engineering offices to locate the solar collectors within the structure of the building. For example, it has been recommended to locate the solar collectors in the location of the roof or terrace or elsewhere in the outer shell of the building, such as an inclined facade which may have been designed specifically for the installation of a solar collector.

Several difficulties and disadvantages in connection with the installation of solar collectors as heretofore described have become evident. A first difficulty resides in the multiple mounting adaptations of the solar collectors and, specifically, as to these adaptations, there is a multiple of dimensions of material required by the designers. A second difficulty is in connection with the fact that normally the solar collectors must not diminish the integrity of the building but rather serve a tightness function in addition to the function and requirements as a component of the heating system. Consequently, the solar collector must respond to criteria of quality, security and durability according to the standards required for the building.

Further, some solar collector installations in present use utilize glass sections onto which a system of fastening the absorber of the solar collector is received. Usually these installations utilize heat bridges which are unfavorable to the overall performance of the solar collector. Further, they make it difficult, if not impossible, to locate with any degree of ease, the insulation carried on the rear face of the absorbers.

In other present-day installations, solar collectors have been integrated in the building by means of made-to-order mounting structures. Such made-to-order mounting structures increase substantially the cost of installation of the solar collectors and greatly increase the cost of utilization of the solar collectors as a component of the heating system of the building or in supply of heat in the hot water line. Thus, it may be that the solar collector economically is not as feasible in use as other forms of heating operations.

SUMMARY OF THE INVENTION

The apparatus for mounting solar collectors according to the present invention successfully overcomes the aforementioned difficulties and disadvantages in that the mounting of solar collectors may be successfully carried out with a limited number of standard parts mounted to the supporting members of a building as required by any of a number of mounting orientations and which may be adjusted to any of a multiple of dimensional requirements of the designers or builders.

According to the invention, the apparatus for mounting solar collectors integrated with the building essentially comprises a base mounting member, an intermediate mounting member, and a top cover member, the former of which is fixedly supported on the structural members of the building. The base mounting member serves as a support for at least portions of the region of an absorber of adjacent pairs of absorbers along an edge so that, along the edges, the absorbers are substantially contiguous. The intermediate mounting member which supports a plurality of individual bearing members is received on the absorbers opposite the region of support, contact being made by the bearing members. The intermediate mounting member also supports the edges of a pair of transparent glass plates of adjacent pairs of plates which, likewise, are substantially contiguous. Contact, similarly, is made by further bearing members. Each transparent glass plate and each absorber of the respective pairs are spaced apart by the intermediate mounting member through a distance substantially equal its height. The top cover member is received over the transparent glass plates within the region at which they are substantially contiguous. The top cover member includes opposite depending sides and further bearing members are supported by the sides for contacting the transparent glass panels when the top cover member is mounted. The intermediate mounting member and the top cover member are of a length coextensive with the length of the transparent glass panels along their edges and the bearing members disposed on opposite sides of the transparent glass panel are continuous throughout that length. The top cover member and the intermediate mounting member are fastened to the base mounting member so that the bearing members, which may be formed of a resilient, deformable material, are forced against the respective surfaces with which they are in contact to provide a tight, bearing connection.

In one embodiment of the invention, the base mounting member may include a rail of substantially U-shaped outline coextensive in length to the length of, for example, the top cover member and a plurality of blocks supported on and capable of adjustment along the rail. The blocks support the absorbers. The intermediate mounting member may be substantially H-shape and include a pair of side elements and a web connecting the side elements in substantially perpendicular, spaced apart relation. Each side element carries a bearing member at each end. And, the top cover member is of M-shaped outline, the central core portion of which may cooperate with a brace extending upwardly from the web so that forces during fastening of the members may be exerted between all bearing members and the surface that they contact.

A particular embodiment of the apparatus will be described hereafter whereby a solar collector including a transparent glass panel and an absorber may be mounted adjacent like solar collectors as an integrated part of a building. In this adaptation, as well as in the adaptation wherein the apparatus may be utilized in the mounting of a pair of panels adjacent like pairs of panels, each of which may be formed of transparent glass, the mounting support will be at the junction between panels of each pair of adjacent panels.

DESCRIPTION OF THE PREFERRED EMBODIMENT

Figure 1:
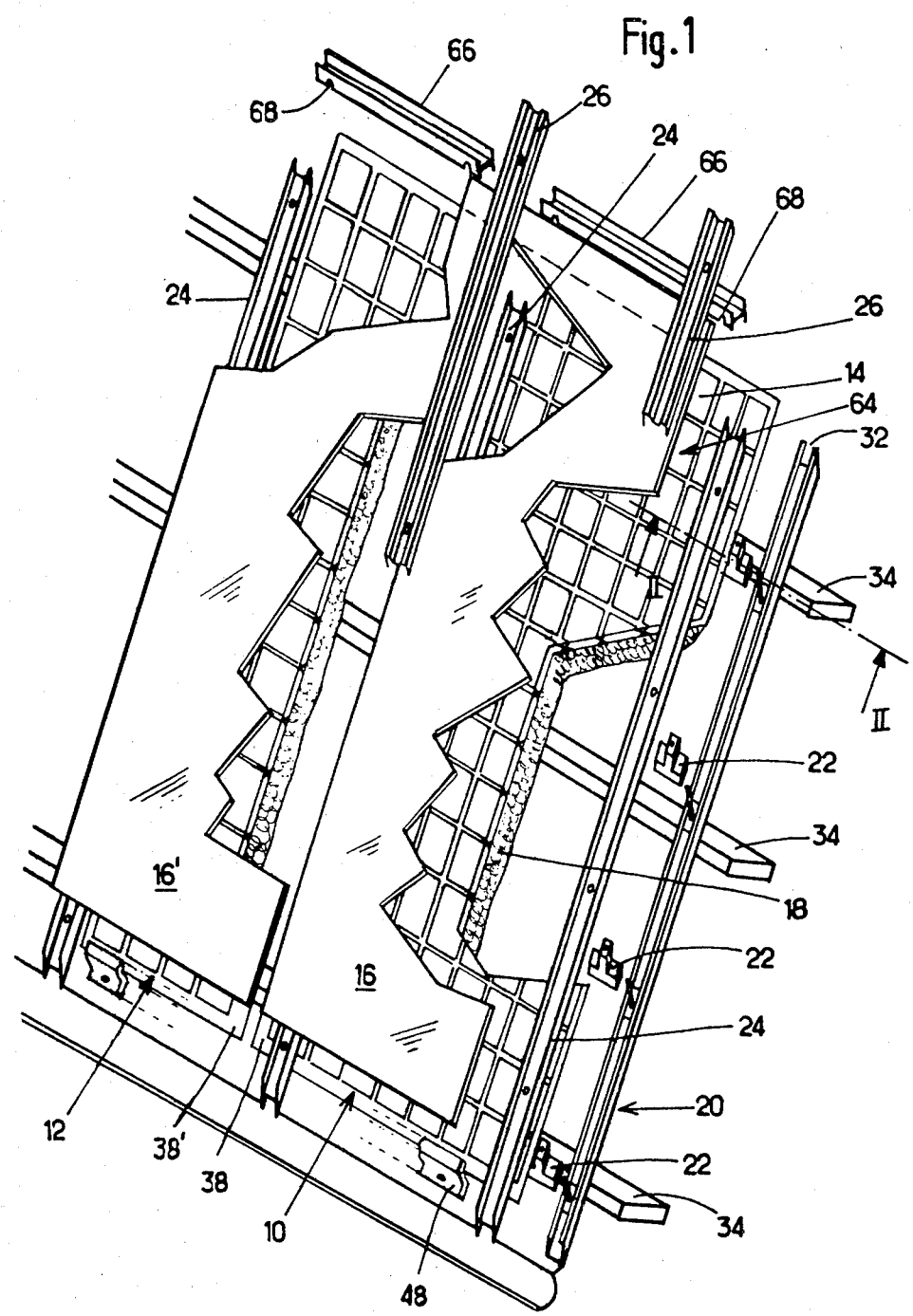
FIG. 1 is a view in perspective of several structural members of a building, a plurality of solar collectors and the apparatus for mounting the solar collectors exploded away from the structural members.
Figure 2:
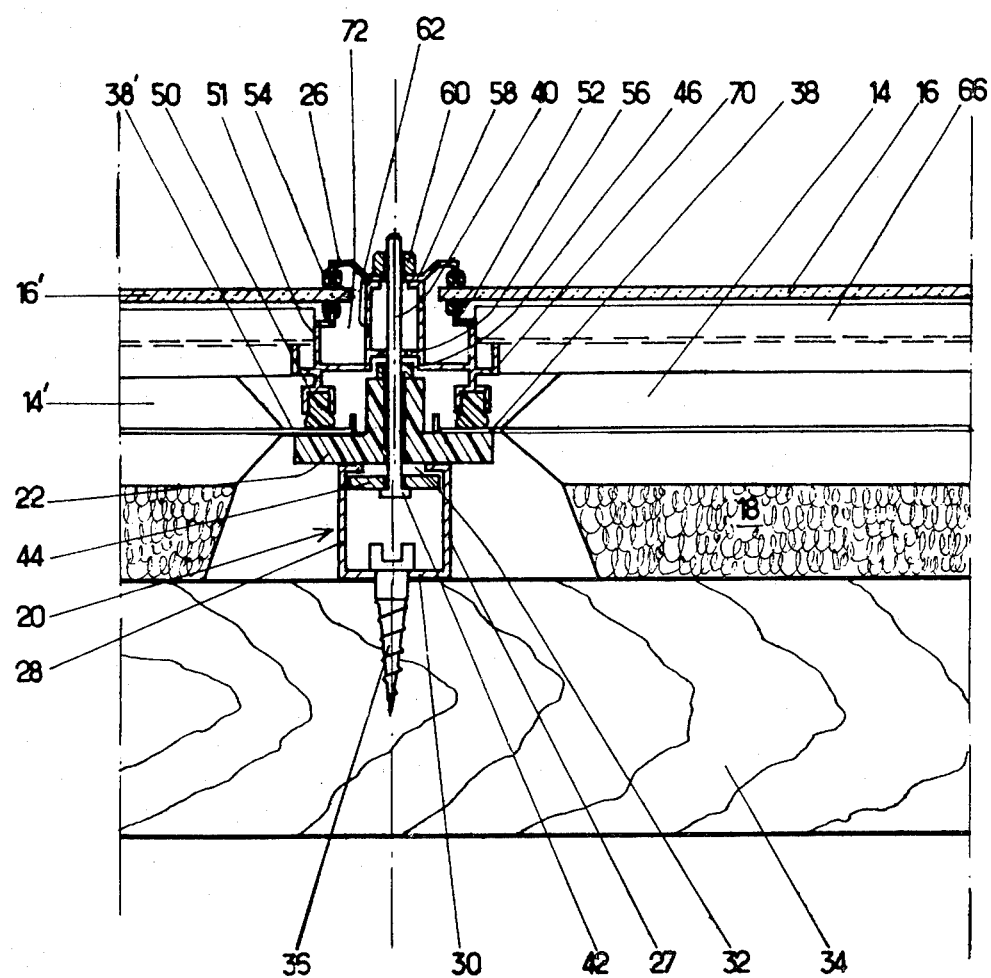
FIG. 2 is a view in section as seen along the line II—II of FIG. 1.

The mounting apparatus, as illustrated in FIGS. 1 and 2, may be employed for mounting adjacent pairs of spaced apart panels which overall may be coextensive on a series of structural members toward the exterior of and integral with a building. To this end, the adjacent pairs of panels may be mounted on the walls of the building but, preferably, the panels are mounted on its roof. The roof may be flat or it may be inclined to extend at an angle to a gable. The adjacent pairs of panels may be located so that their major dimension is parallel to the line of greatest pitch of the roof or the panels may be arranged so that their major dimension extends along a line perpendicular thereto. It is contemplated that the panels of each pair may be transparent and comprised either of a suitable plastic or glass thereby to provide the function of a skylight within a portion of or throughout the entire roof, such as the roof of a greenhouse, but in the preferred embodiment which will be described hereafter, the panels of each pair of panels comprise a solar collector. Solar collectors 10, 12 are illustrated in FIG. 1.

Solar collectors have a structure and an operation which are known in the art and except as may be required in the description of the apparatus for mounting and its manner of use, a full description of the structure and operation of the solar collector will be dispensed with. It is to be noted, however, that the solar collector includes an absorber and a transparent panel, together with a layer of insulating material. To this end, the solar collector 10 includes an absorber 14 and a glass panel 16; and the solar collector 12 includes an absorber 14' and a transparent panel 16'. The transparent panels will be referred to hereafter as "panels" and may be considered as being formed of either of the aforementioned materials. Both absorbers are in thermal bond with a heat carrying fluid and the panels are located above the absorber with which it is associated. Overall, the panel and the absorber of each pair of panels are substantially coextensive. The layer of insulating material is carried upon the lower surface of each absorber within the area slightly inward of its outer perimeter. The layer of insulating material is designed to limit the transmission of heat either from the interior to the exterior of the building or vice versa.

FIGS. 1 and 2 illustrate two adjacent solar collectors and the mounting structure for mounting the solar collectors so that the absorber and panel of one solar collector is substantially contiguous, respectively, to the absorber and panel of the adjacent solar collector. Additional solar collectors may be mounted on the building adjacent to the solar collectors illustrated in FIGS. 1 and 2 to define a plurality of three or more solar collectors. To this end, a number of mounting apparatus to be described will be employed.

The apparatus for mounting the solar collectors to the roof generally includes a base mounting member including a rail 20 and a plurality of blocks 22 for supporting the edges of adjacent absorbers, an intermediate mounting member 24 received on the opposite surface of the adjacent absorbers and, in turn, providing support for the adjacent panels in an overlying position spaced from the absorber with which it is associated, and a top cover member 26 traversing between the edges of the panels and supported on the panels.

As may be seen to best advantage in FIG. 2, the rail 20 overall is somewhat U-shaped including a pair of sidewalls or wings 27, 28 extending upwardly from a base or core 30. A short length of each sidewall is bent toward the other to define a slot 32 which opens up in a substantially rectangular channel. Both the slot and channel extend along the entire length of the rail. As has been described, the rail may extend along the line of greatest pitch of the roof and is fastened to the structural members comprising the horizontally disposed purlins 34. The rail may extend perpendicular thereto and may be fastened to other structural members, such as trusses and rafters (not shown). A plurality of lag screws 36 may be employed for this purpose. A plurality of rails 20 are used in mounting the plurality of solar collectors and each rail is disposed in parallel with the other rails of the family. Further, the axes of the rails are located on centers which correspond substantially to the nominal width of the absorber and panel of the solar collector located therebetween. For example, the spacing of the rails 20 may accommodate the components of the solar collector of a nominal width or having a minor dimension of 40 cm, 60 cm, 90 cm, 1 m and 1.2 m. For purposes of enhancing the aesthetics, the solar collectors may be arranged such that adjacent solar collectors are of different nominal widths. Accordingly, the otherwise monotonous sequence is broken up.

The block 22, as may be seen in FIG. 2, is in the form generally of an inverted "T" having a base surface and a pair of side wing surfaces opposite the base. The side wing surface extends outwardly of the stem. Preferably, the block is formed of a thermal insulating material of which many are well known. Each side wing surface provides a supporting surface for one of the adjacent absorbers of the adjacent solar collectors. To this end, one side wing surface provides support for the region adjacent edge 38 of absorber 14 and the other side wind surface provides support for the region adjacent edge 38' of absorber 14'. Thus, the two absorbers will be located in substantially contiguous relation along these edges corresponding to the major dimension. The two absorbers, however, are prevented from moving into abutting relation by the stem of each of the aligned blocks. The stems of blocks supported by adjacent rails also function to prevent movement of the absorbers in the opposite direction. The absorbers are also constrained against movement in the opposite direction by a lip disposed along the edge of each absorber location between the stem and a bearing member, mounted as will be described below.

Each block 22 of a plurality of blocks associated with a respective rail 20 is disposed so that the base surface resides on the side members or wings 27, 28, adjacent the slot 32. Each block is provided with a bore which extends through the stem and base for purposes of securing each block to its rail. The several blocks 22 may be replaced by a section of insulating material of the same shape.

A bolt 40 and a pair of nuts 44, 46 provide securement for each block on its supporting rail. To this end, the bolt, having first received a nut 44 of disc outline received along the threaded length to a position adjacent a head 42, is passed through the bore in block 22. The head and disc nut is entered into the end of the rectangular channel in the rail and upon location of the block relative to other blocks at prescribed intervals the nut 46 is threaded down on the block to draw the head 42 upwardly so that the disc nut tightly engages the surface within the channel adjacent the slot 32. Each individual block is immobilized along the rail 20 in this fashion. Preferably, the spacing between consecutive blocks along each rail is determined by the nominal length of the absorbers 14, 14' of each solar collector 20 and the mechanical conditions. The space between consecutive blocks may range, for example, from between 50 cm and 1.5 m.

A bracket 48 may be fastened, for example, to each of several rails thereby to prevent the first absorber of each of the solar collectors, mounted in the disposition as illustrated in FIG. 1, from sliding relative to its supporting blocks during the course of mounting of the solar collectors. The bracket, as illustrated in FIG. 1, includes a base, an upstanding wall and a top lip forming a pocket by which the absorber may be retained positionally.

The intermediate mounting members 24, as perhaps best seen in FIG. 2, are of an outline to approximate that of the letter "H". To this end, the intermediate mounting members include a pair of side elements and a web or core 56 connecting the side elements in a manner that they extend generally perpendicular to the web. The side elements include upper arms 51 and lower arms 51', the arms being spaced apart by a distance substantially equal to the length of the web. The lower arms support bearing elements 50 and the upper arms support bearing elements 52. Particularly, the lower arms are formed to provide a U-shaped channel and a bearing member is supported in each channel. The bearing members 50 may be continuous or they may be discontinuous and disposed along the length of the channels at the intervals of the blocks 22. The bearing members 52 are received around the edges of the upper arms and are continuous along the length of the intermediate mounting member.

As may be seen in FIG. 2, the intermediate mounting member is supported by the bearing members 50 in the region of the edges 38, 38' of absorbers 14, 14', respectively. The intermediate mounting member, in turn, provides support for the panels 16, 16'. The panels are supported on bearing members 52 in spaced, parallel relation to the absorbers with which they are associated.

The top cover member 26 generally is of the shape of an "M" including a core 58 having a width to traverse the space between panels 16, 16' and a pair of sides depending along opposite edges. A bearing member 54 which is continuous along the length of the top cover member is supported in each side. The bearing member 54, in a manner similar to the manner of support of the bearing member 52 on the upper arms 51, includes a slit therealong for frictional receipt on the sides. The bearing members 52 and 54 cooperate on opposite sides of the panels 16, 16', generally in alignment one with the other, to assure tightness of the panels and to provide a seal within the region of their edges.

Both the core 56 of intermediate mounting member 24 and the core 58 of top cover member 26 are provided with a plurality of bores located at spaced intervals which correspond to the spacing of the blocks 22 as required by the nominal length of absorbers to be used. The bolt 40 extends through each core such that a nut 60 may be threaded down on the top cover member. The bearing members 50, 52 and 54 may be formed of a resilient, deformable material, such as neoprene, rubber or one of the rubber substitutes, all as well known, and thereby subject to deformation into sealing engagement with the surface with which it is in contact. A brace 62 forming a part of the intermediate member 26 extends upwardly from the core 56 along the length of the intermediate mounting member and on opposite sides of the location of the several bores. The top cover member, in addition to its support on the panels 16, 16' is supported on the brace so that the tightening forces are imparted not only on the panels at bearing members 54 but also on the absorbers 14, 14' through bearing members 50, the counteracting surfaces of the side wings of blocks 22 and on the bearing members 52 counteracting with bearing members 54.

As may be appreciated from the previous discussion and as may be observed from FIGS. 1 and 2, an air passage 64 is created between the components of each solar collector and the structure for mounting the same. A section 66 which may be formed by a pair of sidewalls and a central web (see FIG. 1) is received between and at spaced locations along a pair of adjacent intermediate mounting members 26. For purposes of connecting each section to each of the adjacent intermediate mounting members, each intermediate mounting member is formed with opposite side wings 70 and the sections within the region of each end are formed with notches 68. The notches, preferably, will be spaced from the ends of the sections so that an upstanding portion of a side wing may be received therein. The side wings extend from the upper arms 51. Further, the sections will be of a height substantially equal to the space between the upper surface of each absorber and the lower surface of each transparent glass panel. And, two or more sections may be used within each passage 64.

The manner of mounting the solar collectors on a structure of a building by means of the particular arrangements heretofore described ensures water-tightness even in the event that there may be leakage between the primary seal formed between bearing members 54 and the panels 16, 16' with which they are in contact. To this end, the structure of the intermediate mounting member 24 provides a gutter 72 on each side of brace 62, between the core 56 and upper arms 51. Seepage water as collected and channeled into the gutter is communicated to a further gutter (not shown) in any conventional manner and ultimately to a downspout or the equivalent (also not shown), and away from the building.

The solar collectors, in addition to their mounting on wood frame buildings may also be mounted on buildings with metal frames and, if necessary, may be dismantled from the outside of either, even if the feedpipes (not shown) of the several absorbers are situated under the absorbers, thereby to obviate the need to work through false ceilings as possibly may be used in some constructions. Thus, additional structural members may be utilized in support of the solar collectors and particularly the insulating material which may require additional light purlins thereunder.

The construction of the rails 20, the intermediate mounting members 24 and the top cover members 26 preferably will be of a type to provide structural support in the support of panels 16, 16' as well as other structures heretofore described, all in compliance with local building codes. Further, at least the top cover member will be of a material to withstand the deleterious effects of ambient conditions, such as heat, moisture, atmospheric pollution, and so forth. Accordingly, the rails 20, the intermediate mounting member 24, and the top cover member 26 may be formed of aluminum which in addition to its capability of structural support is light in weight so as not to introduce excessive weight to the structural members of the building on which the solar collectors are supported.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

What is claimed is:

1. Apparatus for mounting panels of adjacent pairs of panels in spaced, overlying relation on a structure comprising:
   (a) base mounting means including a rail and a plurality of blocks adapted for supporting one panel of each said adjacent pair of panels, said rail having a surface and an opening through said surface into a channel, and said blocks disposed on and along said surface;
   (b) means fixedly mounting said rail on a series of structural members disposed in a parallel family toward the exterior of said structure, and each said one panel disposed on a respective surface of said blocks spaced from said structural members and substantially contiguous with their facing edges extending substantially perpendicular to said structural members;
   (c) intermediate mounting means of a length substantially coextensive with the length of said facing edges, said intermediate mounting means including
      (1) a pair of side elements and
      (2) a web connecting said side elements between their ends to locate said side elements in spaced apart, substantially parallel relation;
   (d) first bearing means;
   (e) second bearing means;
   (f) means mounting said first and second bearing means on first and second ends of said side elements, respectively, said intermediate mounting means received on each said one panel so that said first bearing means acts against a surface thereof within the region of said facing edges, and each said other panel received on said second bearing means, likewise, to be substantially contiguous and with their facing edges extending substantially perpendicular to said structural members;
   (g) top cover means extending between said other panels along their facing edges and including side members projecting from said top cover means toward said other panels;
   (h) third bearing means mounted on said side members for supporting said top cover means on said other panels, each said bearing means formed of a resilient, deformable material; and
   (i) securing means extending through each said block, intermediate mounting means and top cover means for mounting the same, said securing means acting between the underside of said rail surface adjacent said opening within said channel and an outer surface of said top cover means whereby each said bearing means is moved into tight bearing relation with the surface with which it is in contact and wherein said second and third bearing means are of a length coextensive with the length of said edges of said other panels to form a seal toward the interior of said structure.

2. The mounting apparatus according to claim 1 wherein each pair of panels comprises a solar collector integrated with said structure and wherein each said one panel is an absorber panel and each said other panel is a transparent panel.

3. The mounting apparatus of claim 2 wherein each said transparent panel is formed of glass.

4. The mounting apparatus of claim 1 wherein each panel of said adjacent pair of panels is formed of glass.

5. The mounting apparatus of claim 1 wherein said rail extends along and substantially perpendicular to said structural members, and said blocks are disposed at intervals along said rail.

6. The mounting apparatus of claim 5 wherein each said block is formed of an insulating material and located at regular intervals along said rail.

7. The mounting apparatus of claim 5 wherein said rail is substantially rectangular in section and said opening includes a slot within and extending along the length of said surface and wherein said securing means comprises:
   (a) a bolt having an elongated threaded stem;
   (b) a head carried at one end of said stem; and
   (c) a plate received on said stem whereby said plate acts between said head and said underside of said rail surface adjacent said slot thereby to permit adjustment of each of said blocks along said rail.

8. The mounting apparatus of claim 7 wherein each of said blocks is provided with a central bore and each of said intermediate mounting means and said top cover means are provided with a plurality of bores, each bore defining an opening through which an individual one of a plurality of bolts may extend, and wherein said securing means further includes a plurality of nuts, a first nut being threaded on said stem to secure each said block along said rail, and a second nut being threaded on said stem into engagement with said top cover means whereby each of said bearing means moves into said tight bearing relation with said surfaces with which they are in contact.

9. The mounting apparatus of claim 1 wherein said intermediate mounting means includes a brace, said brace formed by a pair of walls extending therealong in spaced relation, said brace providing a surface against which said top cover means is adapted to act when secured by said securing means.

10. The mounting apparatus of claim 2 wherein said solar collectors are integrated with the roof of said structure and said structural members comprise one of a family of frame elements, purlins, trusses, rafters, and the like.

11. The mounting apparatus of claim 5 wherein each pair of panels comprises a solar collector integrated with said structure and said intermediate mounting means is disposed parallel to said rail.

12. The mounting apparatus of claim 11 wherein said solar collectors are integrated with the roof of said structure and said intermediate mounting means is arranged along the line of greatest pitch.

13. The mounting structure of claim 12 including a bracket, said bracket mounted to said structural members and cooperating with the lower edge of each absorber of each said solar collector to immobilize it in a sliding direction.

14. The mounting apparatus of claims 1 or 2 replicated along said structure in a parallel family to mount at least a plurality of three pairs of panels.

15. The mounting apparatus of claim 14 including a plurality of barrier sections, each barrier section being of a width to extend substantially between said overlying panels and of a length to extend between adjacent intermediate mounting means, and means to mount each said barrier section to said adjacent intermediate means thereby to provide a barrier and overcome the formation of air currents in an open passage.

16. The mounting apparatus of claim 15 wherein a plurality of barrier sections are mounted between adjacent intermediate members at regular intervals, and said mounting means includes a finger and a notch, each said finger carried by one of said side elements and said notch formed in said barrier section at opposite ends to receive a finger.

17. The mounting apparatus of claim 9 including a gutter for water seepage, said gutter formed by said brace, side elements and web.

* * * * *